(12) United States Patent
Tsumagari et al.

(10) Patent No.: US 8,058,761 B2
(45) Date of Patent: Nov. 15, 2011

(54) ROTATING ELECTRICAL MACHINE

(75) Inventors: Hiroshi Tsumagari, Fukuoka (JP); Iwao Myojin, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 12/842,004

(22) Filed: Jul. 22, 2010

(65) Prior Publication Data

US 2011/0012462 A1 Jan. 20, 2011

Related U.S. Application Data

(63) Continuation of application No. PCT/JP2009/050528, filed on Jan. 16, 2009.

(30) Foreign Application Priority Data

Jan. 23, 2008 (JP) .................................. 2008-012840

(51) Int. Cl.
*H02K 1/28* (2006.01)
(52) U.S. Cl. .......... 310/156.12; 310/156.13; 310/156.26
(58) Field of Classification Search ............. 310/156.12, 310/13, 26, 261.009, 55, 61, 135, 41–49; H02K 1/27, 1/28
See application file for complete search history.

(56) References Cited

U.S. PATENT DOCUMENTS

| | | | | |
|---|---|---|---|---|
| 6,630,766 B1 * | 10/2003 | Kirn et al. ...................... | 310/418 |
| 7,378,774 B2 * | 5/2008 | Torii et al. ............... | 310/216.041 |
| 7,777,387 B2 * | 8/2010 | Nagai et al. ............ | 310/216.043 |
| 7,893,591 B2 * | 2/2011 | Myojin .................. | 310/216.013 |
| 2005/0127768 A1 * | 6/2005 | Welke et al. ............. | 310/156.26 |
| 2009/0146519 A1 * | 6/2009 | Myojin .................... | 310/156.53 |

FOREIGN PATENT DOCUMENTS

| | | |
|---|---|---|
| JP | 8-149725 | 6/1996 |
| JP | 8-290265 | 11/1996 |
| JP | 2000-125518 | 4/2000 |
| JP | 2005-137117 | 5/2005 |
| JP | 2005-160170 | 6/2005 |
| JP | 2007-159281 | 6/2007 |
| JP | 2007-228730 | 9/2007 |
| JP | 2007-267585 | 10/2007 |
| JP | 2008099488 A * | 4/2008 |
| WO | WO 2008139531 A1 * | 11/2008 |

OTHER PUBLICATIONS

International Search Report for International Application No. PCT/JP/2009/050528, Apr. 21, 2009.
Written Opinion of the International Searching Authority for International Application No. PCT/JP/2009/050528, Apr. 21, 2009.

* cited by examiner

*Primary Examiner* — Quyen Leung
*Assistant Examiner* — Thomas Truong
(74) *Attorney, Agent, or Firm* — Ditthavong Mori & Steiner, P.C.

(57) ABSTRACT

Permanent-magnet holding projections provided at end portions of adjacent segment core pieces that face each other have connecting portions at the centers of the permanent-magnet holding projections. Permanent-magnet holding projections included in the segment core pieces that are on either side of the permanent-magnet holding projections having the connecting portions in a thickness direction are provided with receiving portions for receiving bulging portions that bulge in the thickness direction when the connecting portions are bent.

14 Claims, 5 Drawing Sheets

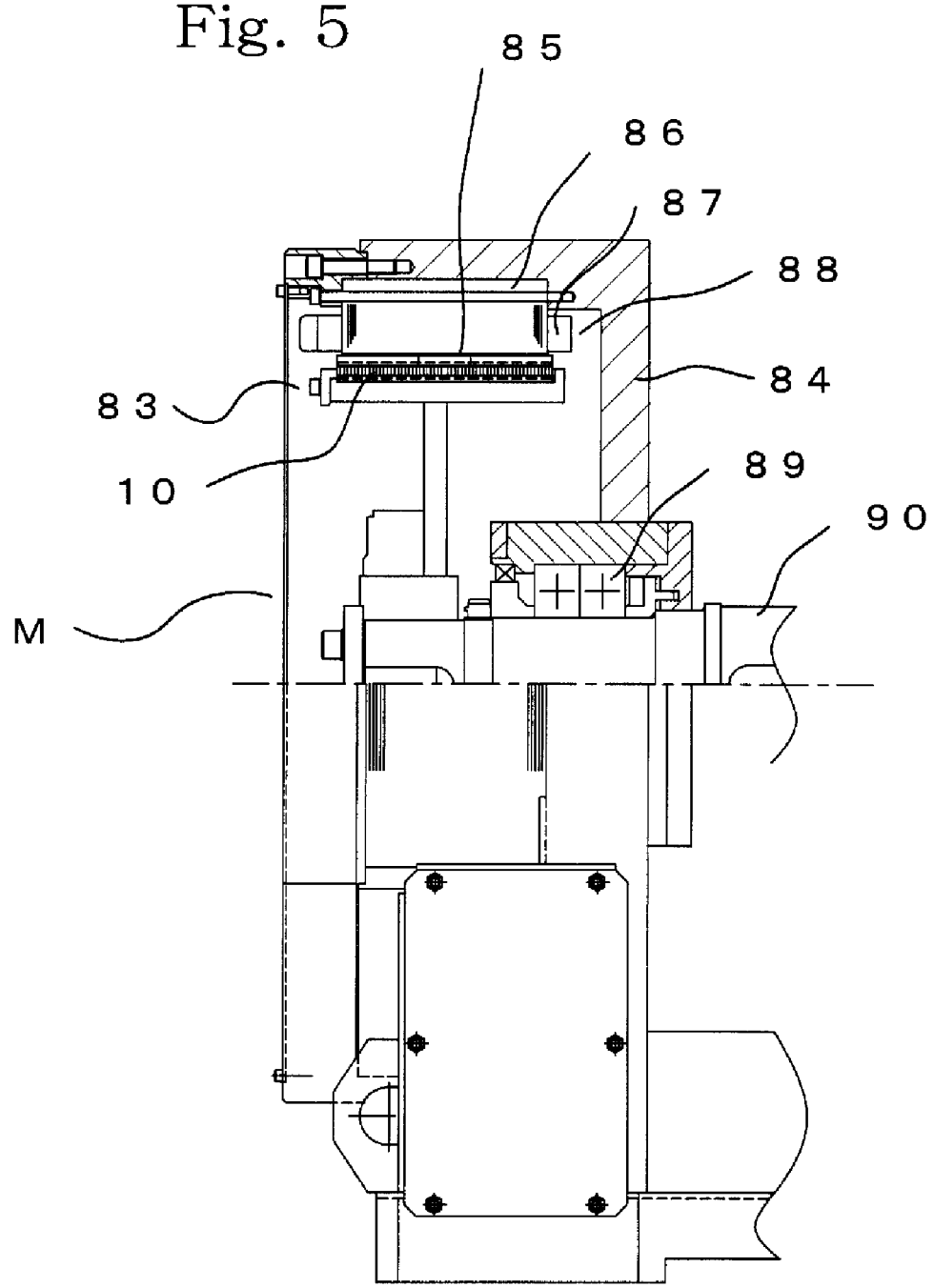

US 8,058,761 B2

ROTATING ELECTRICAL MACHINE

CROSS-REFERENCE TO RELATED APPLICATION

The present application is a continuation application of PCT/JP2009/050528, filed Jan. 16, 2009, which claims priority to Japanese Patent Application No. 2008-012840, filed Jan. 23, 2008. The contents of these applications are incorporated herein by reference in their entirety.

BACKGROUND OF THE INVENTION

Field of the Invention

The present invention relates to a rotating electrical machine.

Japanese Unexamined Patent Application Publication No. 2005-137117 laid open on May 26, 2005, for example, discloses a rotating electrical machine including a rotor having a laminated core in which a plurality of arc-shaped segment cores that are connected to each other at the ends thereof are formed into a cylindrical shape.

SUMMARY OF THE INVENTION

According to an aspect or the present invention, a rotating electrical machine includes a stator and a rotor. The rotor includes a laminated core having arc-shaped segment core pieces that are continuous to each other and a plurality of permanent magnets arranged on a surface of the laminated core. The segment core pieces are connected to each other in a band-like shape by connecting portions, each segment core piece having a plurality of permanent magnet holders including permanent-magnet holding projections that are arranged with intervals therebetween at an outer side of the segment core piece in a radial direction. The permanent-magnet holding projections provided at end portions of the adjacent segment core pieces that face each other have the connecting portions at the centers of the permanent-magnet holding projections. The permanent-magnet holding projections included in the segment core pieces that are on either side of the permanent-magnet holding projections having the connecting portions in a thickness direction are provided with receiving portions for receiving bulging portions that bulge in the thickness direction when the connecting portions are bent. The segment core pieces that are continuous to each other are bent at the connecting portions and are laminated such that the segment core pieces are helically wound while circumferential edges of the segment core pieces are aligned.

BRIEF DESCRIPTION OF THE DRAWINGS

The present invention will be described in further detail with reference to the accompanying drawings wherein:

FIG. 5 is a sectional side view of a rotating electrical machine according to an embodiment of the present invention.

DETAILED DESCRIPTION OF THE PREFERRED EMBODIMENTS

Figure 1A:
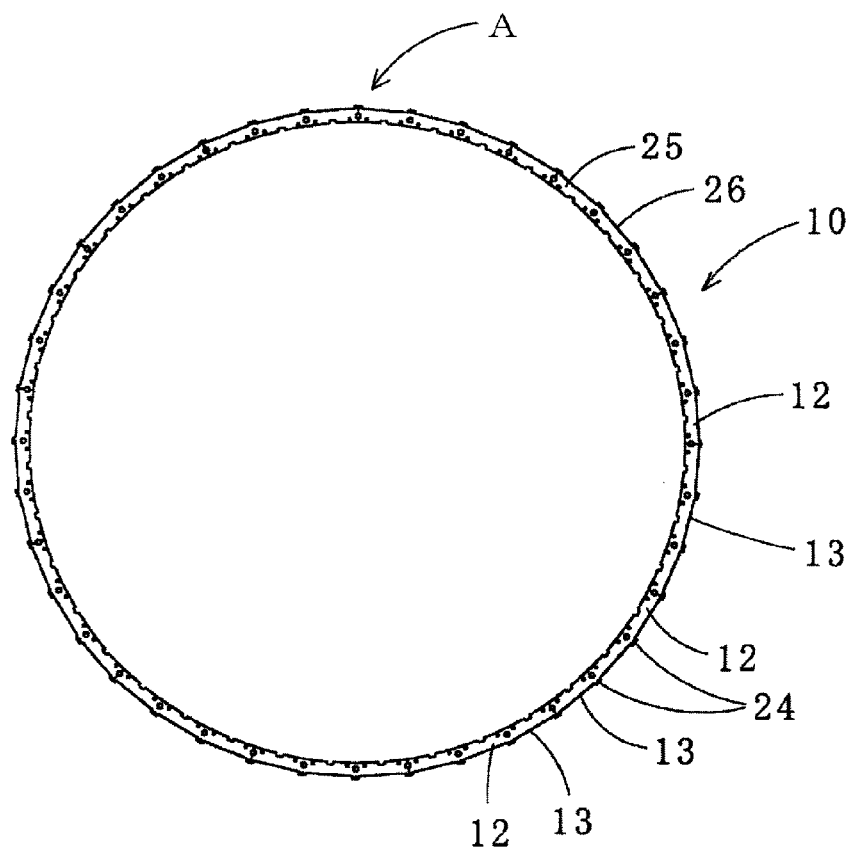
FIG. 1A is a plan view of a laminated core of a rotor according to an embodiment of the present invention.

Embodiments of the present invention will now be described with reference to the accompanying drawings.

As illustrated in FIGS. 1A, 1B, 2A, and 2B, a laminated core 10 of a rotor according to an embodiment of the present invention is formed by helically winding and laminating a plurality of arc-shaped segment core pieces 12 that are connected to each other by connecting portions 11. The laminated core 10 includes 40 poles, that is, 40 permanent magnet holders 13 in total at an outer periphery thereof, and each segment core piece 12 includes three permanent magnet holders 13.

Figure 2A:
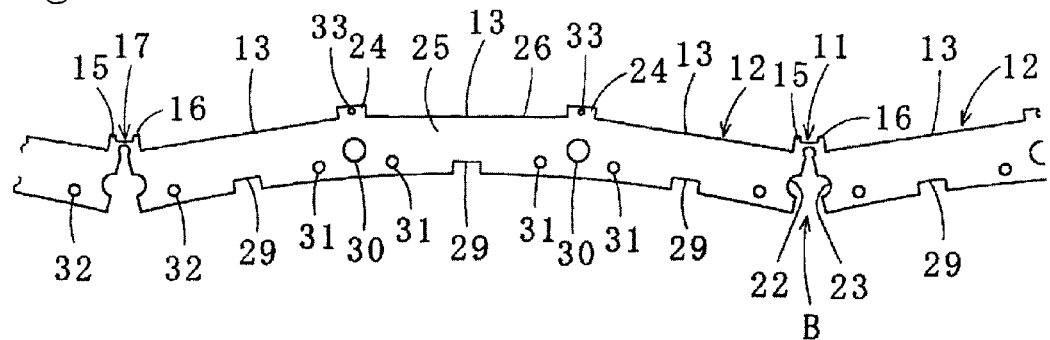
FIG. 2A is a plan view of band-shaped segment core pieces that are connected to each other by connecting portions.
Figure 2B:
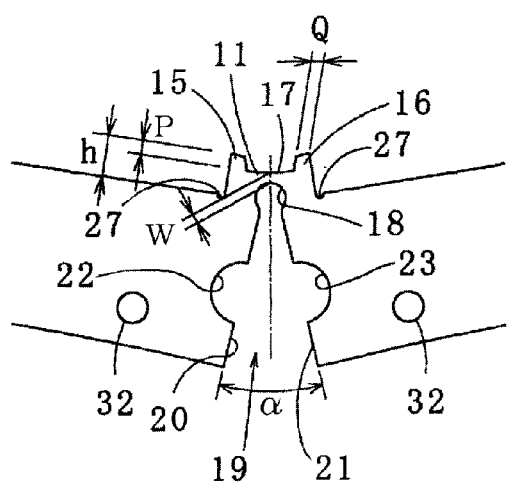
FIG. 2B is an enlarged view of a section shown by arrow B in FIG. 2A.

As illustrated in FIGS. 2A and 2B, the segment core pieces 12 are punched out from a band-shaped magnetic steel plate by press working, and are connected to each other by the connecting portions 11.

The connecting portions 11 are formed such as to connect projections 15 and 16 for holding permanent magnets to each other. The projections 15 and 16 are provided at the ends of the segment core pieces 12 in a circumferential direction. Each of the pairs of projections 15 and 16 serves as a single permanent-magnet-holding projection that is disposed at an end of a permanent magnet holder 13 and that has a connecting portion 11 at the center. However, for simplicity of explanation, the projections 15 and 16 are illustrated as left and right projections that are separate from each other.

A first cutout 17 having a recessed shape is formed at an outer side of each connecting portion 11 in the radial direction. The first cutout 17 is formed such that when the connecting portions 11 are bent so as to arrange the segment core pieces 12 in an annular shape, a portion that projects radially outward (radially bulging portion) does not project beyond a line that connects the outer ends of the projections 15 and 16 in the radial direction. A dimension W of each connecting portion 11 in the radial direction is within the range of one to three times the plate thickness of the segment core pieces 12. If the dimension of each connecting portion 11 is below this range, the rigidity of the connecting portion 11 is relatively low and the connecting portion 11 easily breaks during transportation or before the bending process. If the dimension of each connecting portion 11 is above the above-described range, the rigidity of the connecting portion 11 is too high and the connecting portion 11 cannot be easily bent in the bending process.

A cutout 19 having a horizontally symmetrical shape is formed at an inner side of each connecting portion 11 in the radial direction. The cutout 19 has an arc-shaped portion 18 with a center angle of 180 to 240 degrees at a deepest position thereof. The arc-shaped portion 18 is formed so as to extend into the projections 15 and 16 such that the connecting portion 11, which is thin, is disposed at an intermediate position of the projections 15 and 16 in the height direction (that is, in the radial direction). The connecting portion 11 can be disposed at any position as long as the position is within the height h of the projections 15 and 16. However, as illustrated in FIG. 2B, the position of each connecting portion 11 is preferably set so as to satisfy the condition that the width Q of the projections 15 and 16 is within the range of two to four times the depth P of the first cutout 17 and within the range of two to four times the plate thickness of the segment core pieces 12. If this condition is not satisfied, the rigidity of the projections 15 and 16 cannot be ensured when the connecting portions 11 are bent and there will be a risk that the permanent magnets cannot be reliably held.

When the number of magnetic poles in the laminated core 10 is n and the number of magnetic poles in each segment core piece 12 is m, the opening angle α between the adjacent segment core pieces 12 that are linearly arranged next to each other, as shown in FIG. 2B, can be calculated as m×360/n degrees. The opening angle α is formed by the cutout 19, and defines an inner side of the connecting portion 11 in the radial direction.

The cutout 19 has sides 20 and 21 that face each other, and second cutouts 22 and 23 having a semicircular recessed shape are formed in the sides 20 and 21, respectively, at central positions thereof in the radial direction.

The permanent magnet holders 13 are formed of the projections 15 and 16 provided at the ends of each segment core piece 12, permanent-magnet-holding projections 24 provided at intermediate positions of each segment core piece 12, and an outer side 26 of a yoke portion 25 in the radial direction. In the state in which the connecting portions 11 are bent, the distance between the outer sides of projections 15 and 16 in the circumferential direction is equal to the width of the projections 24 in the circumferential direction. Accordingly, a plurality of permanent magnets (40 permanent magnets in this embodiment) having the same shape are arranged along the periphery of the laminated core 10 with constant intervals therebetween.

Third cutouts 27 are formed at positions where the projections 15, 16, and 24 intersect the outer side 26 of the yoke portion 25 in the radial direction, that is, at the ends in the circumferential direction of an inner side of each permanent magnet holder 13 in the radial direction. The third cutouts 27 have a recessed shape with a radius of curvature of, for example, 0.2 mm or more and provide an effect of absorbing the differences in the processing accuracy at the right-angled portions.

Trapezoidal cutouts 29 are formed in an inner side of each segment core piece 12 in the radial direction at central positions of the permanent magnet holders 13. The width of the cutouts 29 increases toward the inner side in the radial direction. The cutouts 29 engage with linear projections (not shown) formed at a predetermined pitch on the outer periphery of a main shaft and a winding shaft of a rotor that includes the laminated core 10.

Guide holes 30, which serve as positioning members for pilot pins (not shown), are formed in the yoke portion 25 at the central positions of the projections 24. Caulking portions (half-blanking caulking portions) 31 are formed at either side of each guide hole 30. The guide holes 30 have the same inner diameter as that of the holes formed by the pairs of second cutouts 22 and 23, and are formed in the yoke portion 25 at the same position in the radial direction as that of the holes formed by the pairs of second cutouts 22 and 23. Caulking portions 32 are formed at either side of each pair of the second cutouts 22 and 23. The caulking portions 32 are formed at positions where the caulking portions 32 can be engaged with the corresponding caulking portions 31 when the connecting portions 11 are bent and the segment core pieces 12 are helically wound.

The projections 24 have circular holes (through holes) 33 at the central positions thereof. The circular holes 33 serve as an example of receiving portions for receiving bulging portions that are generated such as to bulge in a thickness direction when the connecting portions 11 of the segment core pieces 12 are bent. The receiving portions are provided in the segment core pieces 12 on either side of the bulging portions in the thickness direction. The receiving portions may be cutouts or recesses formed by coining that do not extend through the projections 24 in the thickness direction thereof.

The number n of magnetic poles is set to a number that is not divisible by the number m of the permanent magnet holders 13 provided in each segment core piece 12 so that the circular holes 33 can be positioned at either side of the connecting portions 11 in the thickness direction when the segment core pieces 12 that are connected to each other by the connecting portions 11 are helically wound.

Figure 1B:
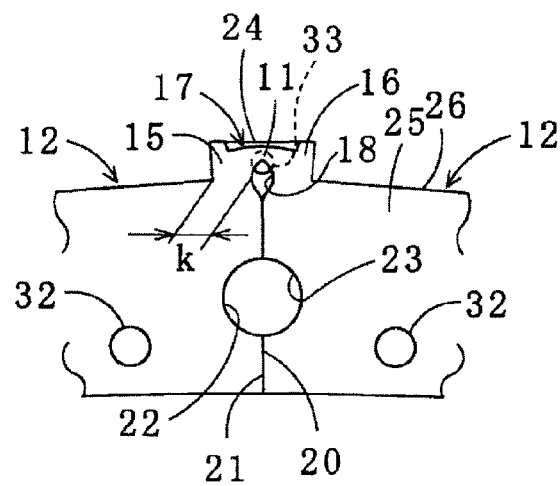
FIG. 1B is an enlarged view of a section shown by arrow A in FIG. 1A.

FIGS. 1A and 1B illustrate the laminated core 10 formed in an annular shape by winding the segment core pieces 12 that are linearly connected to each other by the connecting portions 11. In the following description, components of the laminated core 10 and components of the segment core pieces 12 are called by the same names and denoted by the same reference numerals as long as they have the same shapes in a plan view of the laminated core 10 and in a plan view of the segment core pieces 12.

In the state in which the segment core pieces 12 are wound into an annular shape, each cutout 19 shown in FIG. 2B having the opening angle α between the adjacent segment core pieces 12 is closed and the sides 20 and 21 of the adjacent segment core pieces 12 are positioned close to each other with a small gap (for example, 0.02 mm to 0.5 mm) therebetween. Therefore, burrs on the sides 20 and 21 generated in the punching process can be prevented from interfering with each other. In addition, even when small errors in the dimensions of the sides 20 and 21 are generated in the punching process, the process of bending the segment core pieces 12 is not affected by the errors. Depending on the circumstances, the sides 20 and 21 may be brought into contact with each other.

Thus, the cutout 19 at the inner side of each connecting portion 11 in the radial direction closes and the arc-shaped portion 18 is formed into an oval shape. Accordingly, a compressing force is applied to the connecting portion 11 at the inner side thereof in the radial direction and a tensile force is applied to the connecting portion 11 at the outer side thereof in the radial direction. In addition, the projections 15 and 16 disposed on either side of the connecting portion 11 receive forces in a direction toward each other. In the present embodiment, the dimension of each connecting portion 11 in the radial direction is in the range of one to three times the plate thickness of the segment core pieces 12, and is also in the range of substantially 0.1 to 0.4 times the width k of base portions of the projections 15 and 16 that are connected to the yoke portion 25. The width k is about 0.5 times the distance between the outermost sides of the projections 15 and 16. Therefore, deformations of the projections 15 and 16 caused by bending of the connecting portions 11 are small, and the permanent magnet holders 13 are suppressed from being deformed.

The guide holes 30, which serve as positioning portions for the segment core pieces 12, and the circular holes formed by the pairs of the second cutouts 22 and 23 are aligned with each other when the segment core pieces 12 are helically wound. The caulking portions 31 and 32 formed at predetermined positions of the segment core pieces 12 are also aligned with each other when the segment core pieces 12 are helically wound. In this state, the segment core pieces 12 that are helically wound and stacked on each other are caulked and laminated together. Thus, a predetermined number (p) of segment core pieces 12, which have the shape of a band-shaped plate (thickness t) and which are connected to each other by the connecting portions 11, are stacked on each other to form the laminated core 10 of a rotor having a predetermined thickness (tp). Subsequently, permanent magnets are fixed to the permanent magnet holders 13 with an adhesive. Thus, the rotor is completed.

FIG. 5 illustrates a rotating electrical machine M, which is a so-called surface permanent magnet motor, structured such that a rotor 83 manufactured in the above-described manner is installed in a housing 84.

In the rotating electrical machine M, a laminated core 86 of a stator 85 and a stator 88 having a stator coil 87 are attached to an inner surface of a cylindrical section of a motor housing 84. A rotating shaft 90 is rotatably attached to the motor housing 84 with a bearing 89 interposed therebetween, and the rotor 83 is attached to the rotating shaft 90.

In the present embodiment, a single band-shaped plate (plate in which the segment core pieces 12 are connected to each other in a band-like shape by the connecting portions 11) is helically wound to form the laminated core 10. However, the laminated core 10 may instead be formed by helically winding a plurality of band-shaped plates (for example, two band-shaped plates) such that the connecting portions 11 are shifted from each other in units of magnetic poles. In such a case, the productivity can be increased since the speed at which the segment core pieces 12 are wound and laminated together can be increased.

Figure 4:
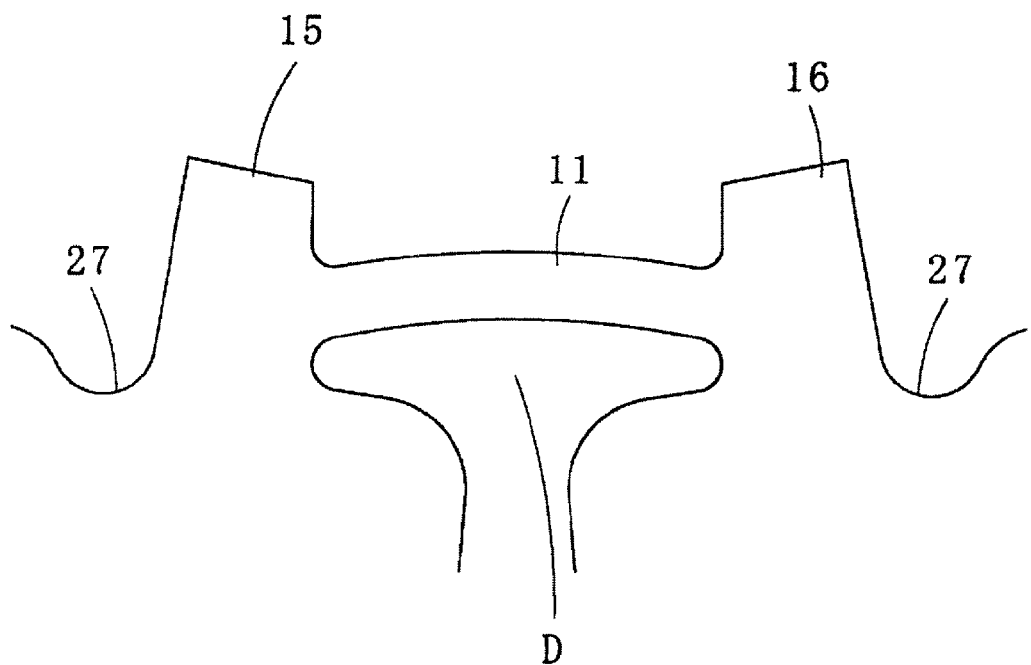
FIG. 4 is a detailed plan view of a section around a connecting portion.

In the present embodiment, the first cutout 17 and the arc-shaped portion 18 are formed at the outer side and the inner side, respectively, of each connecting portion 11 in the radial direction, and each connecting portion 11 is disposed at an intermediate position of the projections 15 and 16 in the radial direction. Accordingly, even when the connecting portion 11 is bent and deformed, deformations of the projections 15 and 16 are suppressed and the deformation of the connecting portion 11 in the radially outward direction is limited within the height of the projections 15 and 16. However, as illustrated in FIG. 4, an oblong hole portion D (upper half in practice) may be formed instead of the arc-shaped portion 18 at an inner side of each connecting portion 11 in the radial direction. In this case, when the connecting portion 11 is bent, the compressing force applied at the inner side of the connecting portion 11 in the radial direction is dissipated over the entire length (and entire width) of the inner side of the connecting portion 11. Therefore, the amount by which the bulging portion protrudes in the thickness direction can be reduced.

Figure 3A:
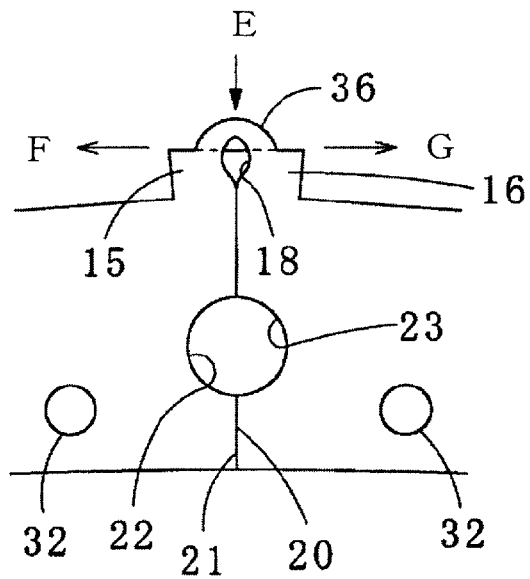
FIG. 3A is a detailed view illustrating an arc-shaped connecting portion that connects segment core pieces.

Referring to FIG. 3A, the deformations of the projections 15 and 16 in the bending process can be reduced when an arc-shaped connecting portion 36 is formed so as to connect the vertices of the projections 15 and 16. However, this is not preferable since the projections 15 and 16 will deform in the directions shown by arrows F and G if a load is externally applied in the direction shown by arrow E.

Figure 3B:
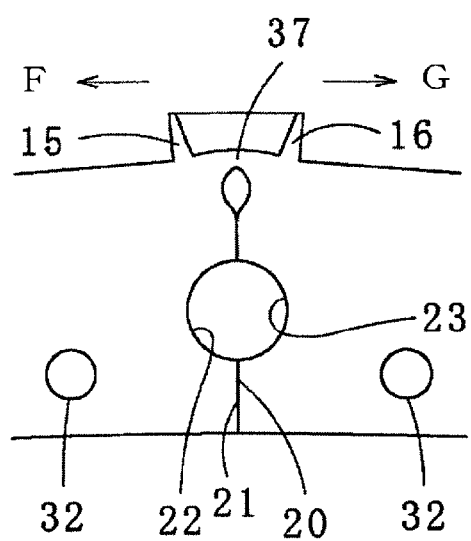
FIG. 3B is a detailed view illustrating a connecting portion that connects segment core pieces and that is formed at a base section of projections.

In addition, it is not preferable to form a connecting portion 37 at a base section of the projections 15 and 16 as shown in FIG. 3B since the projections 15 and 16 will be largely deformed in the directions shown by arrows F and G when the connecting portion 37 is bent.

In the above-described embodiment, a so-called surface permanent magnet motor, in which permanent magnets are provided on an outer surface of a laminated core of a rotor in the radial direction thereof, is explained as an example. However, as another embodiment, the present invention may be applied to a so-called interior permanent magnet motor in which permanent magnets are provided inside a laminated core of a rotor. In this case, a structure similar to the structure of the connecting portion 37 shown in FIG. 3B except the projections 15 and 16 are omitted and a structure similar to the structure shown in FIG. 2A except the projections 24 provided at intermediate positions of each segment core piece 12 are omitted are used.

What is claimed is:

1. A rotating electrical machine comprising:
   a stator; and
   a rotor,
   wherein the rotor includes
      a laminated core having arc-shaped segment core pieces that are continuous to each other, and
      a plurality of permanent magnets arranged on a surface of the laminated core,
   wherein the segment core pieces are connected to each other in a band-like shape by connecting portions, each segment core piece having a plurality of permanent magnet holders including permanent-magnet holding projections that are arranged with intervals therebetween at an outer side of the segment core piece in a radial direction,
   wherein the segment core pieces that are continuous to each other are bent at the connecting portions and are laminated such that the segment core pieces are helically wound while circumferential edges of the segment core pieces are aligned,
   wherein the permanent-magnet holding projections provided at end portions of adjacent segment core pieces that face each other in a circumferential direction have the connecting portions at the centers of the permanent-magnet holding projections, and
   wherein the permanent-magnet holding projections included in the segment core pieces that are adjacent to the permanent-magnet holding projections having the connecting portions in a thickness direction, which is parallel to an axial direction of the helix, are provided with receiving portions for receiving bulging portions in the axial direction where the bulging portions bulge in the thickness direction when the connecting portions are bent.

2. The rotating electrical machine according to claim 1, wherein the receiving portions are cutouts, through holes, or recesses.

3. The rotating electrical machine according to claim 1, wherein a dimension of the connecting portions in the radial direction is in the range of one to three times the plate thickness of the segment core pieces.

4. A rotating electrical machine comprising:
   a stator; and
   a rotor,
   wherein the rotor includes
      a laminated core having arc-shaped segment core pieces that are continuous to each other, and
      a plurality of permanent magnets arranged on a surface of the laminated core,
   wherein the segment core pieces are connected to each other in a band-like shape by connecting portions, each segment core piece having a plurality of permanent magnet holders including permanent-magnet holding projections that are arranged with intervals therebetween at an outer side of the segment core piece in a radial direction,
   wherein the permanent-magnet holding projections provided at end portions of the adjacent segment core pieces that face each other have the connecting portions at the centers of the permanent-magnet holding projections, wherein the permanent-magnet holding projections included in the segment core pieces that are on either side of the permanent-magnet holding projections having the connecting portions in a thickness direction are provided with receiving portions for receiving bulging portions that bulge in the thickness direction when the connecting portions are bent, wherein the segment core pieces that are continuous to each other are bent at the connecting portions and are laminated such that the segment core pieces are helically wound while circumferential edges of the segment core pieces are aligned, wherein the receiving portions are cutouts, through holes, or recesses, and wherein the permanent-magnet holding projections having the connecting portions are provided with first cutouts having a recessed shape at outer sides of the permanent-magnet holding projections in the radial direction, the first cutouts preventing radial bulging portions from projecting beyond the permanent-magnet holding projections, the radial bulging portions being formed at outer sides of the connecting portions in the radial direction when the connecting portions are bent.

5. The rotating electrical machine according to claim 4, wherein second cutouts having a recessed shape are formed in side edges of the adjacent segment core pieces in a circumferential direction, the second cutouts forming positioning portions when the connecting portions are bent.

6. The rotating electrical machine according to claim 5, wherein third cutouts having a recessed shape are formed at the ends in the circumferential direction of inner sides of the permanent magnet holders in the radial direction.

7. The rotating electrical machine according to claim 1, wherein side edges of the adjacent segment core pieces are positioned close to each other.

8. A rotating electrical machine comprising:
a stator; and
a rotor,
wherein the rotor includes:
a laminated core having arc-shaped segment core pieces that are connected to each other at end portions thereof by connecting portions, the segment core pieces being bent at the connecting portions such that the segment core pieces are helically wound while circumferential edges of the segment core pieces are aligned to form the laminated core; and
a plurality of permanent magnets arranged on a surface of the laminated core, wherein each segment core piece has a plurality of permanent magnet holders including permanent-magnet holding projections that are arranged with intervals therebetween at an outer side of the segment core piece in a radial direction, wherein the permanent-magnet holding projections provided at the end portions have the connecting portions at the centers of the permanent-magnet holding projections, wherein, when the connecting portions are bent to form the laminated core, a bulging portion protrudes from each of the connecting portions in a thickness direction parallel to an axial direction of the helix, and wherein the permanent-magnet holding projections included in the segment core pieces that are adjacent to the connecting portions in the thickness direction have receiving portions for receiving the bulging portions of the adjacent connecting portions.

9. The rotating electrical machine according to claim 8, wherein the receiving portions are cutouts, through holes, or recesses.

10. The rotating electrical machine according to claim 8, wherein a dimension of the connecting portions in the radial direction is in a range of one to three times a plate thickness of the segment core pieces.

11. The rotating electrical machine according to claim 9, wherein the permanent-magnet holding projections having the connecting portions are provided with first cutouts having a recessed shape at outer sides of the permanent-magnet holding projections in the radial direction, the first cutouts preventing radial bulging portions from projecting beyond the permanent-magnet holding projections, the radial bulging portions being formed at outer sides of the connecting portions in the radial direction when the connecting portions are bent.

12. The rotating electrical machine according to claim 11, wherein second cutouts having a recessed shape are formed in side edges of the adjacent segment core pieces in a circumferential direction, the second cutouts forming positioning portions when the connecting portions are bent.

13. The rotating electrical machine according to claim 12, wherein third cutouts having a recessed shape are formed at the ends in the circumferential direction of inner sides of the permanent magnet holders in the radial direction.

14. The rotating electrical machine according to claim 8, wherein side edges of the adjacent segment core pieces are positioned close to each other.

* * * * *